T. PONSAR, DEC'D.
A. FINKENKELLER, ADMINISTRATOR.
PROCESS OF MILLING ALFALFA.
APPLICATION FILED JUNE 1, 1907.
1,056,297.
Patented Mar. 18, 1913.
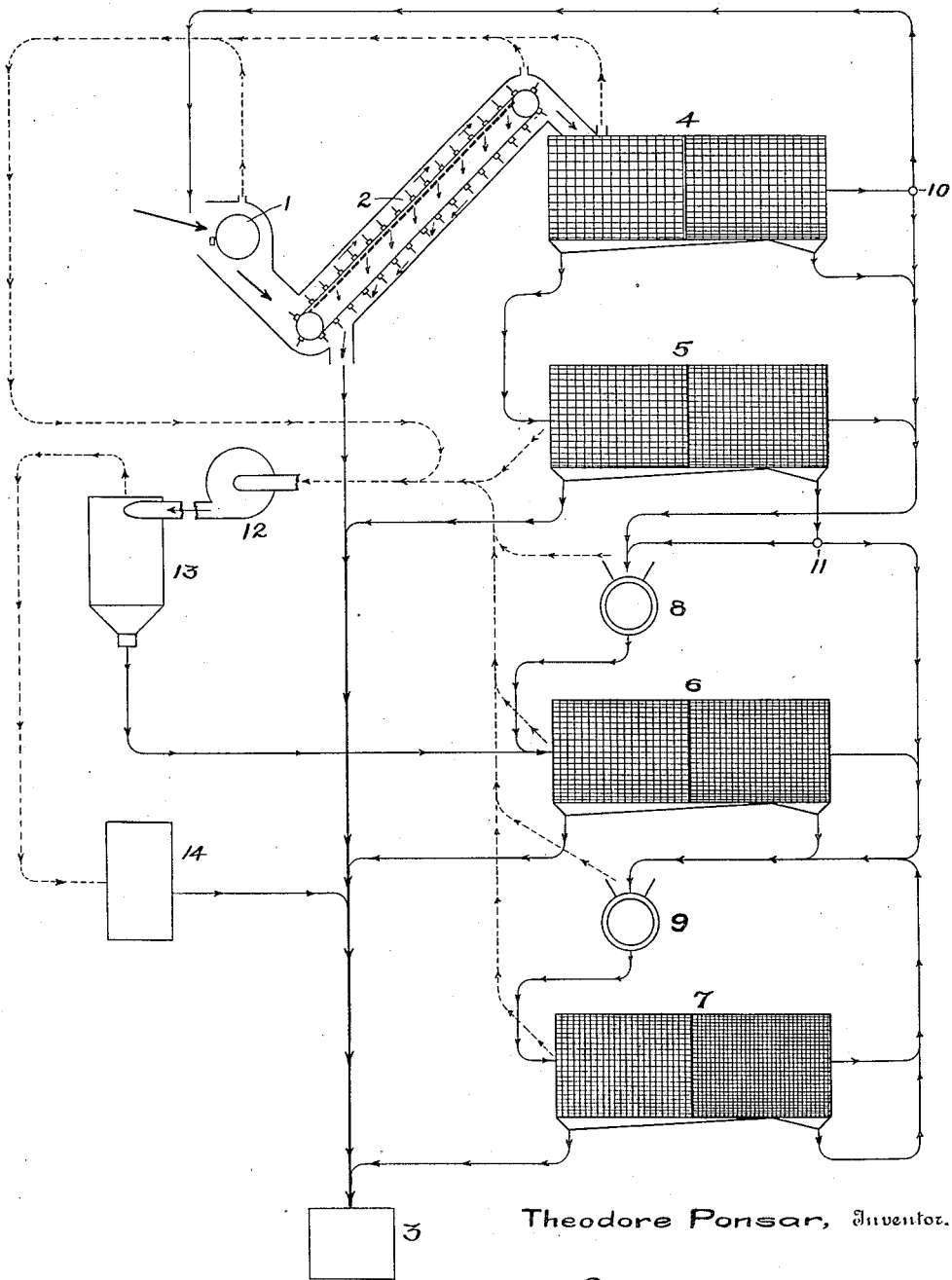
Theodore Ponsar, Inventor.

UNITED STATES PATENT OFFICE.

THEODORE PONSAR, OF SOUTH OMAHA, NEBRASKA; ANDREW FINKENKELLER, OF FLORENCE, NEBRASKA, ADMINISTRATOR OF SAID PONSAR, DECEASED, ASSIGNOR TO DAVID O. BARNELL AND EDWARD L. BRADLEY, BOTH OF OMAHA, NEBRASKA.

PROCESS OF MILLING ALFALFA.

1,056,297.  Specification of Letters Patent.  Patented Mar. 18, 1913.

Application filed June 1, 1907. Serial No. 376,887.

*To all whom it may concern:*

Be it known that I, THEODORE PONSAR, a citizen of the United States, and a resident of South Omaha, in the county of Douglas and State of Nebraska, have invented certain new and useful Improvements in Processes of Milling Alfalfa, of which the following is a specification.

My invention relates to processes of milling alfalfa in which the cured hay is reduced to a meal or ground product.

It is the object of my invention to provide a process by which a more uniform, marketable and healthful product may be made than is possible by the methods heretofore employed in milling this material.

In the milling of alfalfa as heretofore done all of the material is passed through the machine or machines, and the leaves and finer stems, being far more brittle and fragile than the coarse stems, are reduced to an almost impalpable powder before the stems are sufficiently reduced. Thus much of the leaf substance is lost in the resultant product, losing identity therein so that the product apparently consists entirely of fragments of the stems. The product so made, when fed to animals without admixture with syrup or other agglutinant for causing cohesion of the finely powdered leaf substance, is unhealthful for the reason that the fine powder is drawn into the lungs and by continued use irritates the same so as to cause a predisposition to disease, if not an actual diseased condition of the tissue. If the milling operation is not carried far enough to powder the leaves the stems are insufficiently reduced and the product is thereby rendered unpalatable and is not so readily eaten or digested by the animals to which it is fed.

In my process the more fragile portions of the material, especially the leaves, are removed from the stock and conducted to the storage bin or packer as fast as the same are reduced to particles of the desired size, while the milling operations on the stems and tougher portions of the material are continued. The product so made, on account of its comparative freedom from dust, may be fed directly to animals without admixture with an agglutinant, and when so fed is easily digested and assimilated, the leaf substance being in the form of thin flakes and the stems being reduced to comparatively small particles, both of which are readily attacked by the digestive juices.

The accompanying drawing is a diagram or "flow-sheet" of an embodiment of my invention.

The cured hay is fed into a cutter 1, which may be of the single-cylinder straw-cutter type, and the cut material is carried to the separating-drag 2 in which it is drawn over a perforated metal screen, a part of the leaves and more fragile portions, which have been sufficiently reduced by the cutter, passing through said screen and going directly to the product in the storage bin or packer 3. The tailings from the separating-drag are taken to the first of a series of reels or separators 4, 5, 6 and 7, the mesh of screens in which gradually decreases in size from the first to the last, as indicated in the drawing. The said reels or separators are preferably of the type provided with double conveyers and tipping valves by which any desired proportion of the separated stock may be cut off and directed to either of the conveyers, the one conveyer taking the finished or semi-finished stock while the other takes the unfinished stock, carrying the same out to be treated with the tailings or separately handled if desired. The unfinished material directed to the second conveyer is designated as the "cut-off." The semi-finished stock separated by the first reel 4 is taken to the second reel 5, from which the finished stock separated thereby goes to the product. The cut-off from the first reel and the tailings from the second reel are taken to the first grinder 8. The tailings from the first reel may be taken either to the first grinder or, where the same consist of long uncut stems, returned to the cutter 1, a valve 10 or equivalent devices being provided for this purpose. The cut-off from the second reel may be taken either to the first grinder 8 or the second grinder 9, a valve 11 being arranged for this purpose. The stock from the first grinder is taken to the third reel 6, from which the finished stock separated thereby goes to the product. The tailings and cut-off from the third reel are taken to the second grinder 9, the stock from said grinder being taken to the fourth reel 7. From said reel the finished stock separated thereby goes to the product while the tailings and cut-off are returned to the second grinder for further reduction.

With ordinary well-cured material the greater part of the leaf substance is sufficiently reduced by the cutter 1 and said leaf substance is separated from the stems and tougher portions of the material by the separating-drag and the first and second reels, passing therefrom directly to the product without further reduction, while the stems and tougher portions of the material pass on to the grinders and are further reduced thereby. However, should any of the leaf substance, through dampness, be in such condition that it is not sufficiently reduced by the cutting operation it will, of course, pass on to the grinders and be reduced therein together with the stems.

The small amount of dust unavoidably produced in the various operations is collected by an exhaust fan or blower 12, the flow thereto from the various machines being indicated by dotted lines, and the discharge therefrom being directed to a collector 13, preferably of the centrifugal or "cyclone" type. The heavier particles separated by said collector are taken to the third reel 6, while the exhaust therefrom, carrying the finer particles, is taken to a second collector 14, preferably of the cloth-screen type, from which the materials collected go to the product.

It will be obvious to those skilled in the art of milling that should it be desired to make two or more grades of product the same may be made by keeping separate the different parts of the stock separated at the various machines, and combining the same in the proper proportions for the different grades desired, instead of taking all the stock to a common receptacle and there combining the same to make a single-grade product.

Now, having described my invention, what I claim and desire to secure by Letters Patent is:

1. The process herein described of preparing a stock product from alfalfa consisting in cutting the cured plant, then separating a part of the leaf substance and the more fragile portions of the plant from the tougher material and depositing the former in a storage bin, then subjecting the tailings of the material to a series of grinding and separating operations to abrade or frictionally reduce said tailings, separating the finished from the unfinished material after each grinding operation and directing the finished material to said bin and returning the tailings from the last separation to the material passing to one of the grinders to once more abrade or frictionally reduce the tailings, and directing all of the remaining separated and finished material to the storage bin, thereby reducing substantially all of the cured plant and combining the reduced material into a single product.

2. The process of manufacturing an alfalfa product for stock food which consists in cutting the plant to liberate the more fragile portions from the tougher material, then passing the tougher material through a series of grinding operations to abrade or frictionally reduce the tailings, again separating the more fragile portions from the tougher material after each grinding operation and, returning the tailings of the last operation to the material passing through one of the grinders to further abrade or frictionally reduce the remaining tailings and combining all of the reduced material into a single product, whereby substantially all of the plant is converted into a single product.

3. The process of manufacturing an alfalfa product for stock food which consists in cutting the plant to liberate the more fragile portions from the tougher material, then separating the more fragile portions from the tougher material, directing the more fragile portions in one direction and conveying the tougher material in a different direction and through a series of grinding operations, again separating the more fragile portions from the tougher material after each grinding operation, then returning the tailings and combining all of the successively reduced tougher portions with the separated more fragile portions of the last operation to the material passing through one of the grinders and finally directing the more fragile portions to the fragile portions first separated, and combining all of the successively reduced tougher portions with the separated more fragile portions, whereby substantially all of the plant is converted into a single product.

4. The process herein described of preparing a stock product from alfalfa which consists in passing the material through a series of reductions and separating the finished from the unfinished material after each reduction and continuing the reducing and separating operations until substantially all of the material is reduced, and combining the separated or fragile portions and the successively reduced tougher portions.

5. The process of milling alfalfa which consists in cutting the cured material, separating the more fragile portions from the tougher portions after such cutting and then further reducing said tougher portions of the material and combining the separated more fragile portions and the successively reduced tougher portions.

6. The process of milling alfalfa which consists in cutting the cured plant, then passing the cut material through a series of reductions and separating the finished from the unfinished stock after each reduction, directing all of the separated and finished material to the storage bin and continuing the reducing and separating operations until all of the material is converted into a single product and directed to said bin.

7. The process of manufacturing a stock food from a plant consisting of fragile leaves and relatively tough stems, which consists in cutting the cured material, then separating the leaf substance from the stems after such cutting, then reducing the stems by grinding operations, and finally combining the reduced material with the separated leaf substance.

8. The process of manufacturing a stock food product from a commodity composed of fragile leaves and relatively tough stems, which consists in cutting the cured commodity, then separating a part of the leaf substance from the stems after such cutting, then passing the remainder of the material through a series of grinding operations, separating the finished material from the unfinished material after each grinding operation, returning the tailings from the last separation to the material passing to one of the grinders, and finally combining all of the remaining separated and finished material into a single product.

9. The process of milling alfalfa which is a commodity embodying leaves and stems, consisting in passing the material through a series of reductions and separating the finished from the unfinished material after each reduction and combining the reduced material into stock food.

10. The process of milling alfalfa which consists in first cutting the cured material to liberate the more fragile portions from the tougher material, then separating the more fragile portions from the tougher portions after such cutting, then further reducing the tougher portions by grinding operations and combining the separated more fragile portions and the successively reduced tougher portions.

11. The process of manufacturing stock-food products from cured alfalfa consisting in cutting the plant to liberate the more fragile portions thereof from the tougher portions, of then separating the fragile portions from the tougher portions, then comminuting the tougher portions by successively grinding the same, separating the reduced portions from the ground product, and again grinding the tailings from the separation.

In testimony whereof I have hereunto subscribed my name in the presence of two witnesses.

THEODORE PONSAR.

Witnesses:
   D. O. BARNELL,
   C. C. A. BAUERCAMPER.